United States Patent [19]

Oboodi et al.

[11] Patent Number: 5,048,343
[45] Date of Patent: Sep. 17, 1991

[54] TEMPERATURE-COMPENSATED STRAIN-GAUGE AMPLIFIER

[75] Inventors: Mohammadreza Oboodi, Livingston; Devlin M. Gualtieri, Ledgewood, both of N.J.

[73] Assignee: Allied-Signal Inc., Morris Township, Morris County, N.J.

[21] Appl. No.: 516,898

[22] Filed: Apr. 30, 1990

[51] Int. Cl.$^5$ .............................................. G01B 5/30
[52] U.S. Cl. .................................. 73/766; 73/862.63
[58] Field of Search ................... 73/766, 862.63, 708

[56] References Cited

U.S. PATENT DOCUMENTS 4,202,218  5/1980  Romo .................................... 73/766
4,355,537  10/1982  Vonder Have .................... 73/766 X

OTHER PUBLICATIONS

R. Dell'Acqua et al., "Characteristics and Performances of Thick Film Pressure Sensors for Automotive Applications", S.A.E. Paper 820319, Detroit (1982).

Primary Examiner—Jerry W. Myracle
Attorney, Agent, or Firm—Ernest D. Buff; Gerhard H. Fuchs

[57] ABSTRACT

A temperature compensated strain gauge amplifier derives compensating signals for offset and gauge errors of bridge transducers from a single temperature sensing element. The amplifier is inexpensive to construct, provides a high degree of voltage linearity with respect to temperature and is reliable in operation.

3 Claims, 2 Drawing Sheets

Temp. Compensated (−1°C, 26°C, 61°C)

Uncompensated

TEMPERATURE-COMPENSATED STRAIN-GAUGE AMPLIFIER

BACKGROUND OF THE INVENTION

1. Field of the Invention

This invention relates to the field of strain-gauge amplifiers, and more particularly to a sensitive, differential bridge amplifier which employs a single temperature sensing element to provide offset voltage temperature compensation and gauge temperature compensation for wheatstone bridge type strain transducers or similar resistance bridge transducers.

2. Description of the Prior Art

Transducers are devices which convert one physical quantity (the stimulus) into another. A class of transducer is the environmental sensor which converts a physical quantity to be measured into an electrical, optical, or similar signal which is received by alarm or process control instruments. Many of these sensors, such as absolute pressure sensors, differential pressure sensors, and strain sensors are designed to convert from the stimulus to a resistance imbalance of a wheatstone bridge circuit. In FIG. 1, for example, the application of a stimulus, such as pressure, to a membrane with affixed or integral resistive elements can increase or decrease these resistance elements by the piezoresistive effect, thereby creating a bridge imbalance. The piezoresistive elements can be arranged so that this stimulus increases the value of resistors 2 and 5 and decreases the value of resistors 3 and 4. This imbalance will create a differential voltage output 6 to appear. Output voltage 6 is a function of the resistance values 2–5 and the excitation voltage 1, as follows:

Output Voltage = (Excitation Voltage)

[(R101/R103)—(R104/R102)]

In practical embodiments of such a bridge sensor, changes in the bridge resistances with applied stimulus are designed to be small in order to attain a linearity of response of the output voltage and the stimulus. Amplification of the resultant small bridge output voltages is therefore usually necessary to produce a signal of a strength needed to control alarm or process circuitry. The necessary signal strength is generally of the order of 4–20 mA for a current output and 0-1 V for a voltage output.

A major problem encountered with sensor/transducers of the type described is their undesirable response to temperature. Since the change of resistance with stimulus is designed to be small, temperature induced changes in the resistances of the bridge circuit can cause a large imbalance signal at a static stimulus. This is known as an offset, or zero, error. In addition, a temperature change is likely to cause a change in the coupling between the stimulus and the bridge resistors, leading to a calibration, or gauge, error; that is, greater or lesser stimulus would be required to generate a particular bridge imbalance at different temperatures. Both the offset and gauge errors can be approximated as linear functions of the sensor temperature.

To overcome this problem, attempts have been made at temperature compensation in strain-gauge amplifiers. In particular, R. Dell'Acqua et al. ("Characteristics and Performances of Thick-film Pressure Sensors for Automotive Applications", S.A.E. Paper 820319, Detroit, 1982) have used thermistors to achieve gauge and offset temperature compensation. The temperature sensing elements in their gauge are thermistors, which respond to temperature in a non-linear fashion, and are not effective over a wide temperature range. Moreover, the circuitry used by Dell'Acqua et al. requires two thermistor temperature sensing elements to achieve both offset and gauge compensation, and is costly to construct.

SUMMARY OF THE INVENTION

The present invention provides a temperature compensated strain-gauge amplifier which is inexpensive, accurate and reliable in operation. Generally stated, the amplifier derives compensating signals for offset and gauge errors of bridge transducers from a single temperature sensing element.

The strain gauge amplifier of the invention has an active semiconductor device adapted to generate a voltage proportional to the absolute, or Kelvin, temperature scale when supplied with a minimum operating current. One type of semiconductor device suitable for use in the strain gauge amplifier is sold by National Semiconductor Corporation under the trade designation LM135. That device, described in detail in the "Linear Databook" published by National Semiconductor Corporation in 1982, provides a voltage output having a high degree of linearity with respect to temperature. In addition, the strain gauge amplifier has a circuit means including a strain gauge bridge element, a temperature sensor for compensating the bridge element and a plurality of operational amplifiers for combining and amplifying voltage signals. Use of a single active semiconductor temperature sensing element in the circuitry of a strain gauge amplifier, provides simultaneous temperature compensation of the offset and gauge errors of (1) a bridge transducer or (2) a bridge transducer in combination with the amplifier itself. The resultant amplifier is inexpensive to construct, provides a high degree of voltage linearity with respect to temperature and is highly reliable in operation.

BRIEF DESCRIPTION OF THE DRAWINGS

The invention will be more fully understood and further advantages will become apparent when reference is made to the accompanying drawings, in which.

DESCRIPTION OF THE PREFERRED EMBODIMENTS

Figure 2:
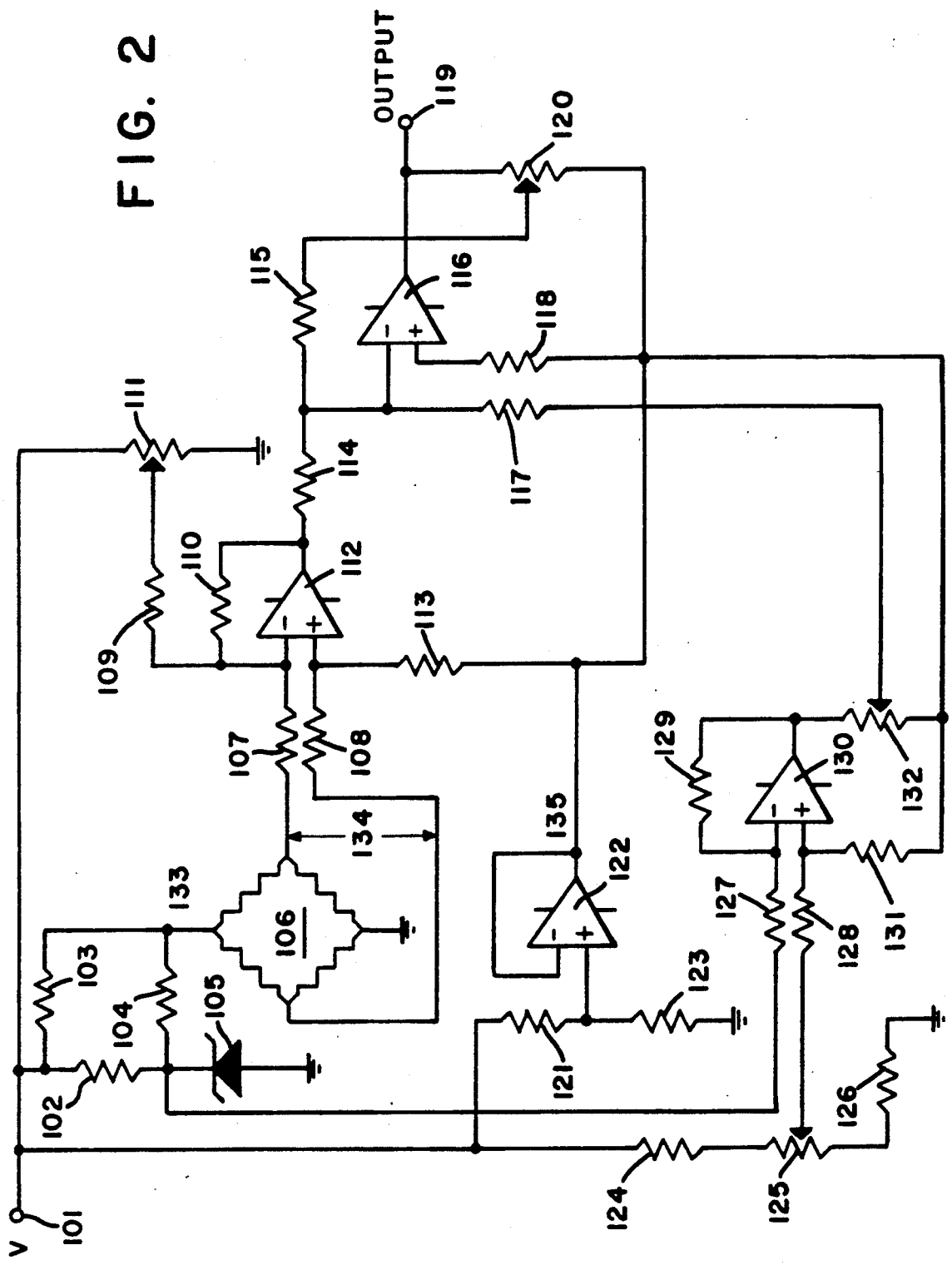
FIG. 2 is a schematic circuit diagram of a temperature compensated strain gauge amplifier according to the present invention.

Referring to FIG. 2 of the drawings, there is shown a strain gauge amplifier according to the present invention. The amplifier has an active semiconductive device 105 adapted to generate a voltage proportional to the absolute temperature scale when supplied with a minimum operating current. A circuit means 101-135 includes a strain gauge bridge element 106, a temperature sensor 105 for compensating bridge element 106 and a plurality of operational amplifiers 112, 116, 122, 130 for combining and amplifying voltage signals.

An excitation current is applied to the semiconductor temperature sensor 105 through resistor 102 connected to a constant voltage source 101. The voltage at the junction of temperature sensor 105 and current sourcing resistor 102 is a highly linear function of the temperature of sensor 105 over a known range of temperatures and currents. Resistors 103 and 104, along with the bridge resistances 106 and resistive loading at the bridge output 134, act as a voltage divider which selects portions of the voltage across temperature sensor 105 and the supply voltage 101 and supplies them as the excitation voltage 133 of bridge 106. Since the voltage across temperature sensor 105 is a linear function of temperature and the supply voltage 101 is constant and insensitive to temperature, the values of resistors 103 and 104 can be calculated to adjust the temperature coefficient of the excitation voltage 133 from a maximum value to zero. If the temperature sensor 105 is proximate to the bridge 106, proper choice of resistors 103 and 104 will cause a temperature variation of the bridge excitation voltage 133 to gauge compensate the bridge output voltage at 134 against temperature changes.

The output voltage 134 of the bridge 106, gauge-compensated in the manner described, is amplified by the differential amplifier circuitry comprised of the amplifier element 112 and its associated resistance elements 107–111 and 113. The input and output voltages of all the amplifier elements in FIG. 2 are referenced to the voltage at 135, the output of amplifier element 122. Amplifier element 122 is wired as a voltage follower to buffer the input voltage derived from resistors 121 and 123 and the supply voltage 101. Since resistors 121 and 123 are of equal value, the voltage at 135 is one-half of the supply voltage 101. Potentiometer 111 is adjusted to remove any initial imbalance of the bridge output voltage 134, so that in the absence of a stimulus to the bridge 106 the output voltage with respect to the voltage at 135 of amplifier element 122 can be made to be zero. The output voltage of amplifier element 112 is then summed with the voltage at the tap of potentiometer 132 and amplified by the amplifier circuitry composed of amplifier element 116 and its associated resistors 114, 115, 117, 118, and 120. Potentiometer 120 sets the gain of amplifier element 116, and thus the scale factor of the bridge element 106.

Amplifier element 130 and its associated resistors 124–129, 131 and 132 achieve offset compensation of the bridge element 106. The voltage across temperature sensor 105 is balanced against the voltage at the tap of potentiometer 125 by the differential amplifier arrangement of amplifier element 130 and its associated circuitry. The amplitude of the output voltage of amplifier element 130 is adjusted by potentiometer 132 before being summed through resistor 117 with the voltage supplied by amplifier element 112 through resistor 114. The inverting input of amplifier element 116 sums the amplified voltage of the bridge and the temperature offset-compensating circuitry built around amplifier element 130. Choice of the polarity of the differential input voltage at amplifier element 130 by connection of resistor 127 and 128 as shown in FIG. 2, or by connection of 127 to the tap of potentiometer 125, instead of to temperature sensor 105, and connection of 128 to temperature sensor 105 instead of the tap of potentiometer 125 and the setting of potentiometer 132 will balance out the temperature effects on the voltages summed by amplifier element 116 to eliminate the temperature induced offset signal of the bridge 106.

Values for each of the components used in the embodiment shown in FIG. 2 are listed Table I below. The values of these components can vary depending upon the type of temperature sensing element 105, the type of bridge sensor 106, the desired sensitivity of the output signal to changes in stimulus, the types of operational amplifiers 112, 116, 122, 130, and the voltage supply 101. Such values are presented for purposes of illustration and should not be construed in a limiting sense.

TABLE 1

Values of components shown in FIG. 2

| Component | Value |
|---|---|
| 101 | 5 Volts |
| 102 | 2.2KΩ |
| 103 | 1.5KΩ |
| 104 | 2.2KΩ |
| 105 | Temp. Sensor (LM335) |
| 106 | Bridge Sensor (5KΩ) |
| 107 | 1MΩ |
| 108 | 1MΩ |
| 109 | 4.7MΩ |
| 110 | 1MΩ |
| 111 | 10KΩ |
| 112 | ¼ (Quad Op-Amp)* |
| 113 | 1820KΩ |
| 114 | 2.2KΩ |
| 115 | 220KΩ |
| 116 | ¼ (Quad Op-Amp)* |
| 117 | 220KΩ |
| 118 | 1KΩ |
| 119 | 0–4 Volts |
| 120 | 10KΩ |
| 121 | 5KΩ |
| 122 | ¼ (Quad Op-Amp)* |
| 123 | 5KΩ |
| 124 | 5KΩ |
| 125 | 10KΩ |
| 126 | 5KΩ |
| 127 | 100KΩ |
| 128 | 100KΩ |
| 129 | 100KΩ |
| 130 | ¼ (Quad Op-Amp)* |
| 131 | 100KΩ |
| 132 | 10KΩ |
| 133 | 3.5–4.5 Volts |
| 134 | 0–20 mVolts |
| 135 | 2.5 Volts |

*112, 116, 122 and 130 are a ¼ Quad Op-Amps (TI-TLC279ID)

The following examples are presented in order to provide a more complete understanding of the invention. The specific techniques, conditions, materials and reported data set forth to illustrate the invention are exemplary and should not be construed as limiting the scope of the invention.

EXAMPLE I

A temperature compensated strain gauge amplifier was constructed with the components and component valves listed in Table I. To compensate for temperature induced changes in the resistances of the bridge, the temperature sensing element utilized a pressure sensor, in the form of a flexible membrane on which strain-sensitive resistor materials were processed in a wheatstone bridge configuration. Deformation of the membrane (by applied pressure or changes in temperature) created a bridge imbalance.

A high pressure gas was supplied from a nitrogen cylinder equipped with a regulator, a pressure gauge and a bleeding valve. The pressure sensor was clamped to a thermostated pressure chuck and was connected to the gas source using copper tubing. After the pressure chuck and sensor reached a constant temperature, the pressure was increased from 0 to 150 psi in increments of 10 psi and the sensor output was read off a digital voltmeter. This experiment was repeated at various temperatures for compensated and uncompensated sensors. The data were then plotted (output vs. pressure) for different temperatures as shown in FIGS. 3A and 3B.

Figure 1:
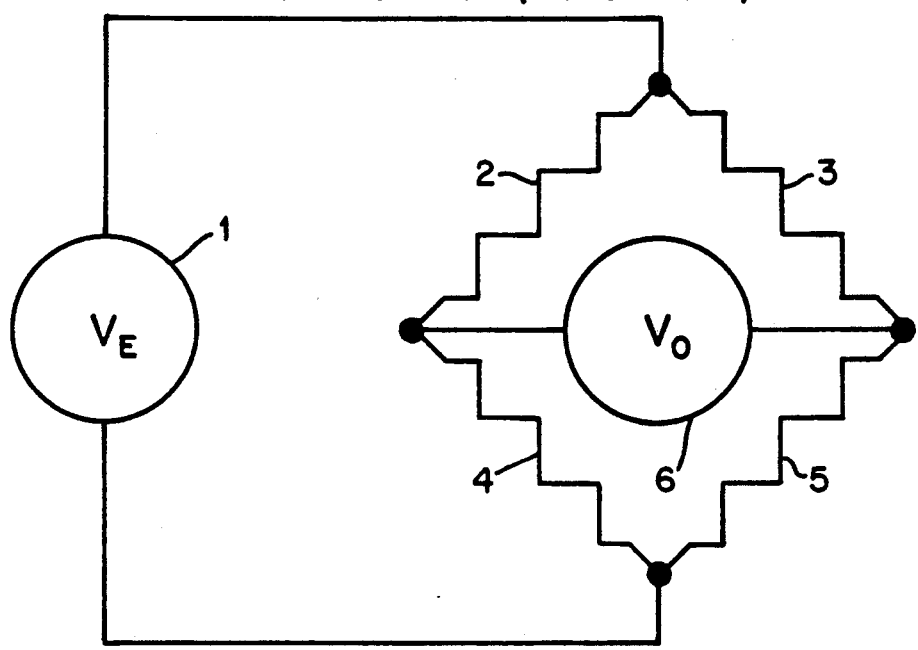
FIG. 1 is a schematic circuit diagram of a prior art strain gauge transducer which is not temperature compensated.
Figure 3A:
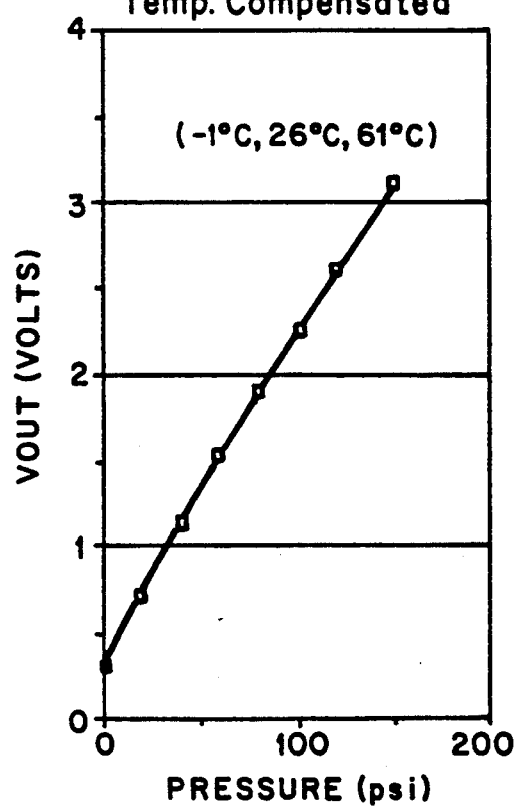
FIGS. 3a and 3b are graphs depicting offset and gauge compensation of a bridge type pressure transducer having the circuitry shown in FIG. 2.
Figure 3B:
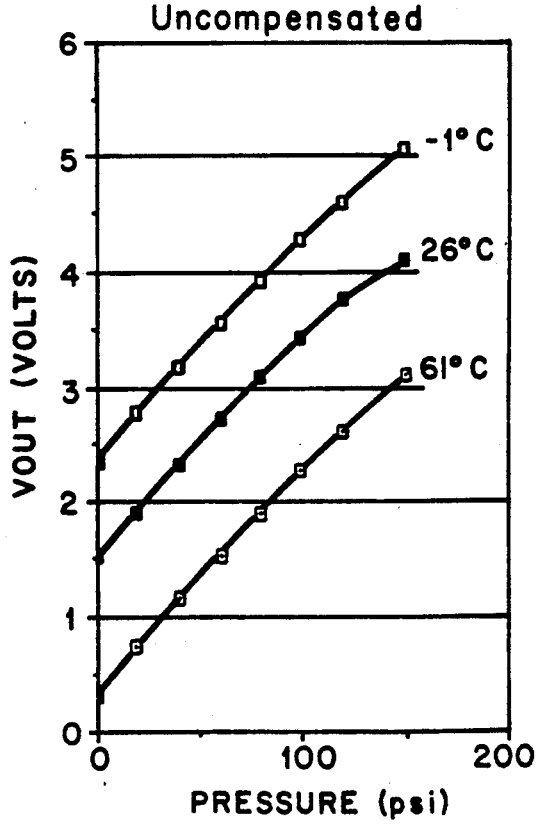

As shown in Example 1, the output for the uncompensated device, in which the semiconductor device (device 105 in FIG. 1) was left out, varies substantially with changes in temperature (FIG. 3A). FIG. 3B represents the pressure sensor response to pressure at the same fixed temperatures after temperature compensation (device 105 in place). It is evident that the described compensation method has virtually eliminated the temperature induced errors from the sensor output. In addition to correcting for the zero offset (changes in output at static pressure), the gauge factor (slope) has also remained substantially constant for the compensated device.

Having thus described the invention in rather full detail it will be understood that such detail need not be strictly adhered to but that further changes and modifications may suggest themselves to one having ordinary skill in the art, all falling within the scope of the invention as defined by the subjoined claims.

We claim:

1. A strain gauge amplifier comprising:
   (a) A constant voltage source for providing a constant voltage to said amplifier;
   (b) semiconductor means electrically connected to said constant voltage source and comprising a temperature sensor for generating a voltage signal proportional to the absolute temperature in response to minimum current;
   (c) circuit means including a strain gauge bridge element connected to said semiconductor means for supplying said voltages, said circuit means cooperating with said temperature sensor to compensate said bridge element and further comprising a plurality of operational amplifiers connected to said strain gauge bridge element and said semiconductor means for combining and amplifying said voltage signal; and
   (d) said temperature sensor being proximate to said bridge element and said circuit means including resistance means comprising a plurality of resistors which cooperate with resistance of said bridge element to provide resistive loading at an output of said bridge element and to form a voltage divider network that selects from voltage across said semiconductor means and voltage supplied from said constant voltage source and applies the selected voltage from said semiconductor means as excitation voltage of said bridge element.

2. A stain gauge amplifier as recited by claim 1, wherein said resistors have vales adapted to adjust the temperature coefficient of the excitation voltage from a maximum value to zero, whereby the output voltage of said bridge element is gauge compensated for temperature changes by temperature induced variations in the excitation voltage of said bridge element.

3. A strain gauge amplifier as recited by claim 2, wherein said circuit means further comprises a differential amplifier circuit for amplifying said output voltage of said bridge element and combining it with an amplified portion of the voltage signal from said temperature sensor to offset compensation for temperature changes.

* * * * *